United States Patent
Ugur et al.

(10) Patent No.: US 12,090,870 B2
(45) Date of Patent: Sep. 17, 2024

(54) CHARGING ARRANGEMENT AND METHOD FOR CHARGING AN ELECTRICAL VEHICLE

(71) Applicant: ABB E-mobility B.V., Delft (NL)

(72) Inventors: Ali Ugur, The Hague (NL); Octavian Craciun, The Hague (NL)

(73) Assignee: ABB E-mobility B.V., Delft (NL)

( * ) Notice: Subject to any disclaimer, the term of this patent is extended or adjusted under 35 U.S.C. 154(b) by 441 days.

(21) Appl. No.: 17/491,551

(22) Filed: Oct. 1, 2021

(65) Prior Publication Data

US 2022/0016992 A1 Jan. 20, 2022

Related U.S. Application Data

(63) Continuation of application No. PCT/EP2020/057918, filed on Mar. 23, 2020.

(30) Foreign Application Priority Data

Apr. 2, 2019 (EP) .................................... 19166874

(51) Int. Cl.
*B60L 53/16* (2019.01)
*B60L 53/36* (2019.01)
(Continued)

(52) U.S. Cl.
CPC .............. *B60L 53/16* (2019.02); *B60L 53/36* (2019.02); *B60L 53/37* (2019.02); *B60L 53/60* (2019.02); *H02J 7/0045* (2013.01)

(58) Field of Classification Search
CPC ...................................................... B60L 53/16
USPC ........................................................ 320/109
See application file for complete search history.

(56) References Cited

U.S. PATENT DOCUMENTS 3,396,931 A 8/1968 Eckstein
2015/0306974 A1 10/2015 Mardall et al.
(Continued)

FOREIGN PATENT DOCUMENTS

CN 205248860 U 5/2016
CN 107302155 A 10/2017
(Continued)

OTHER PUBLICATIONS

European Patent Office, Extended European Search Report in European Patent Application No. 19166874.8, 7 pp. (Jul. 4, 2019).
(Continued)

*Primary Examiner* — Jerry D Robbins
(74) *Attorney, Agent, or Firm* — Leydig, Voit & Mayer, Ltd.

(57) ABSTRACT

A charging arrangement includes an electrical vehicle and a charging device configured for charging the electrical vehicle with electrical energy, where the electrical vehicle includes a first charging connector, and the charging device includes a second charging connector configured for connecting with the first charging connector, a bi-stable mechanics to which the second charging connector is attached and which is configured for holding the second charging connector in two stable equilibrium positions, whereby in one stable equilibrium position the second charging connector is connected to the first charging connector and the other stable equilibrium position the second charging connector is unconnected to the first charging connector and an actuation device configured for moving the second charging connector between the two stable equilibrium positions.

24 Claims, 1 Drawing Sheet

(51) Int. Cl.
  *B60L 53/37* (2019.01)
  *B60L 53/60* (2019.01)
  *H02J 7/00* (2006.01)

(56) References Cited

U.S. PATENT DOCUMENTS

| | | | |
|---|---|---|---|
| 2018/0091191 A1* | 3/2018 | Berger | B60L 53/68 |
| 2018/0236885 A1* | 8/2018 | Gamsjäger | B60L 53/36 |
| 2019/0009680 A1* | 1/2019 | Kauffmann | B60L 53/126 |
| 2019/0016218 A1* | 1/2019 | Haag | H02J 50/10 |
| 2020/0180456 A1* | 6/2020 | Kauffmann | B60L 53/30 |
| 2021/0284036 A1* | 9/2021 | Daminelli | B60L 53/30 |

FOREIGN PATENT DOCUMENTS

| | | |
|---|---|---|
| CN | 108909511 A | 11/2018 |
| DE | 102018106046 B3 | 3/2019 |
| EP | 3000645 A1 | 3/2016 |
| GB | 865888 A | 4/1961 |

OTHER PUBLICATIONS

European Patent Office, International Preliminary Report on Patentability in International Patent Application No. PCT/EP2020/057918, 7 pp. (Sep. 28, 2021).
European Patent Office, International Search Report in International Patent Application No. PCT/EP2020/057918, 3 pp. (Jun. 19, 2020).
European Patent Office, Written Opinion in International Patent Application No. PCT/EP2020/057918, 6 pp. (Jun. 19, 2020).
National Intellectual Property Administration, P. R. China, Office Action in Chinese Patent Application No. 202080026621.0, 21 pp. (Dec. 4, 2023).
European Patent Office, Office Action in European Patent Application No. 19166874.8, 7 pp. (Jul. 18, 2022).

* cited by examiner

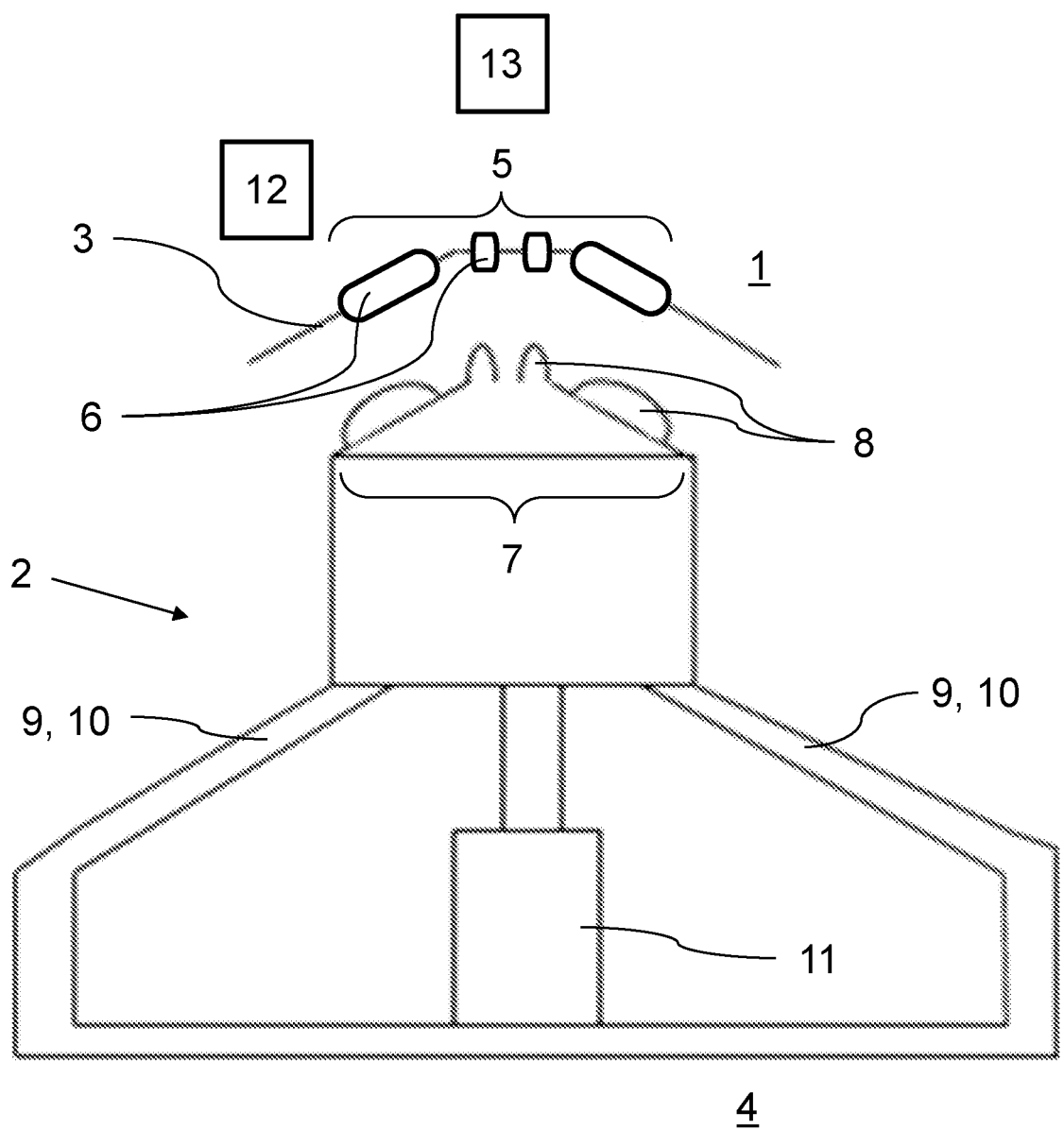

CHARGING ARRANGEMENT AND METHOD FOR CHARGING AN ELECTRICAL VEHICLE

CROSS-REFERENCE TO PRIOR APPLICATION

This application is a continuation of International Patent Application No. PCT/EP2020/057918, filed on Mar. 23, 2020, which claims priority to European Patent Application No. EP 19166874.8, filed on Apr. 2, 2019. The entire disclosure of both applications is hereby incorporated by reference herein.

FIELD

One or more embodiments of the present invention may relate to a charging arrangement comprising an electrical vehicle and a charging device configured for charging the electrical vehicle with electrical energy, whereby the electrical vehicle comprises a first charging connector, and the charging device comprises a second charging connector configured for connecting with the first charging connector. The invention further relates to a method for charging an electrical vehicle, comprising a charging device configured for charging the electrical vehicle with electrical energy, the charging device comprising a second charging connector configured for connecting with a first charging connector of the electrical vehicle.

BACKGROUND

Electric vehicle, EV, direct current, DC, fast charging systems and methods often use a so-called Combined Charging System, CCS, protocol according to International Electrotechnical Commission IEC 61851-23 and SAE J1772 standard for charging electrical vehicles both in the US and in the European Union, EU. As charge currents increase, liquid cooled charging cables for connecting an Electric Vehicle Supply Equipment, EVSE, via a charging connector with the electrical vehicle are becoming more commonly used. High power charging requires charging cables which can carry 500 A current at a voltage of 1000V. The liquid cooling allows conductors within the charging cable to become thinner, and thereby easier to use, because excessive heat due to high charge currents and charging cable internal resistances is taken care of.

A drawback of liquid cooled charging cables is that the charging cable becomes very stiff and heavy. In addition, weight of such high-power liquid cooled charging cables is increasing and is becoming too much for an ordinary person to handle. Besides that, charging connectors are vulnerable components that are easily damaged if dropped or handled incorrectly and cooled charging cables only offer limited extensions to those power levels. Therefore, robotic systems, such as schunk systems, have been developed for overcoming these disadvantages. However, such robotic systems are expensive and potentially dangerous for humans being too close to such robotic arms.

SUMMARY

In one or more embodiments, the present invention may provide a charging arrangement that includes an electrical vehicle and a charging device configured for charging the electrical vehicle with electrical energy. The electrical vehicle may include a first charging connector. The charging device may include a second charging connector, a bi-stable mechanics, and an actuation device. The second charging connector may be configured for connecting with the first charging connector. The bi-stable mechanics may be attached to the second charging connector and configured for holding the second charging connector in two stable equilibrium positions, whereby in a first stable equilibrium position the second charging connector may be connected to the first charging connector and in a second stable equilibrium position the second charging connector may be unconnected to the first charging connector. The actuation device may be configured for moving the second charging connector between the two stable equilibrium positions.

In one or more embodiments, the present invention may provide a method for charging an electrical vehicle. The method may include a charging device configured for charging the electrical vehicle with electrical energy. The charging device may include a second charging connector configured for connecting with a first charging connector of the electrical vehicle; and a bi-stable mechanics attached to the second charging connector, configured for holding the second charging connector in two stable equilibrium positions. The method may further include moving the second charging connector between the two stable equilibrium positions, whereby in a first stable equilibrium position the second charging connector is connected to the first charging connector and in a second stable equilibrium position the second charging connector is unconnected to the first charging connector.

One or more embodiments of the present invention may provide a charging arrangement and a method for user-friendly and flexibly charging the electrical vehicle with electrical energy.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 shows a charging arrangement comprising an electrical vehicle and a charging device configured for charging the electrical vehicle with electrical energy according to an exemplary embodiment in a schematic side view.

DETAILED DESCRIPTION

Thus, in one or more embodiment, a charging arrangement may comprise an electrical vehicle and a charging device configured for charging the electrical vehicle with electrical energy, whereby the electrical vehicle comprises a first charging connector, and
  the charging device comprises
    a second charging connector configured for connecting with the first charging connector,
    a bi-stable mechanics to which the second charging connector is attached and which is configured for holding the second connector in two stable equilibrium positions, whereby in one stable equilibrium position the second charging connector is connected to the first charging connector and the other stable equilibrium position the second charging connector is unconnected to the first charging connector and an actuation device configured for moving the second connector between the two stable equilibrium positions.

Further, in one or more embodiments, a method for charging an electrical vehicle may include a charging device configured for charging the electrical vehicle with electrical energy, the charging device comprising a second charging connector configured for connecting with a first charging connector of the electrical vehicle and a bi-stable mechanics to which the second charging connector is attached and which is configured for holding the second connector in two stable equilibrium positions, and comprising the step:

Moving the second connector between the two stable equilibrium positions, whereby in one stable equilibrium position the second charging connector is connected to the first charging connector and the other stable equilibrium position the second charging connector is unconnected to the first charging connector.

Therefore, one or more embodiments of the invention may provide an automatic connection system for electrical vehicles, which is characterized by low complexity and can be realized at low costs, in particular if compared to robotic arms, other robotic machinery or schunk systems. The term automatic connection system is to be understood in regard to the present application as a means which allows nearly automatically establishing an electrical connection between the conductive charging interface and the charger. The proposed solution provides cheap connection possibility comprising only a few moving parts. The proposed charging device can be fully automatically actuated for connecting to the electrical vehicle or handled by an ordinary person without difficulties. Further, the proposed solution is usable without any additional steps except for parking the electrical vehicle, which also could be done automatically in case of a self-driving car. Besides that, high-power cabling in the electrical vehicle can be kept shorter and thus cheaper compared to prior art solutions. In sum, the proposed solution provides a reliable alternative to expensive and complex schunk systems known from prior art.

For charging the electrical vehicle with electrical energy, the electrical vehicle may drive above the charging device, which is preferably arranged on ground. The charging device is preferably dimensioned such that the electrical vehicle, when the bi-stable mechanics with the second charging connector is in the other equilibrium position, can drive above the charging device without touching the charging device. Once the electrical vehicle has stopped above the charging device, the second charging connector, which so far has preferably rested close to ground, is moved vertically up into the one stable equilibrium position thereby establishing an electrical connection with the first charging connector. Such way the actuation device is used for 'switching' the bi-stable mechanics between the other into the one equilibrium position. Once connected the second charging connector can be vertically moved up further for increasing contact force between the charging connectors. In an analogous manner the second charging connector can be disconnected from the first charging connector by vertically moving down the second charging connector such that the bi-stable mechanics 'switches' from the one into the other equilibrium position. In both equilibrium positions, thanks to the bi-stable mechanics, the second charging connector is firmly held in the respective position.

The first charging connector and/or the second charging connector are preferably provided as plug or socket, and/or are configured for charging currents of 63 A, 80 A, 125 A or more AC or DC. The two stable equilibrium positions are preferably more than 10, 20 or 30 cm distant from each other. Unconnected to the first charging connector is to be understood that the second charging connector is not plugged into the first charging connector. The bi-stable mechanics can be provided in different ways while holding the second charging connector in preferably two vertically distant positions. In the one stable position the electrical vehicle can be charged with electrical energy.

The charging device is preferably provided as and/or part of an Electric Vehicle Supply Equipment, EVSE, for charging the electrical vehicle according to a called Combined Charging System, CCS, protocol according to IEC 61851-23 and SAE J1772. The Combined Charging System, CCS, protocol is a fast charging method for charging electric vehicles delivering high-voltage direct current via a charging connector derived from SAE J1772 standard (IEC Type 1) or IEC Type 2 connector. Automobile manufactures that support CCS include Jaguar, Volkswagen, General Motors, BMW, Daimler, Ford, FCA, Tesla and Hyundai. The CSS standard is controlled by the so called CharIN consortium. Besides other protocols such as, for example, CHAdeMO, as abbreviation of CHArge de Move, or GB/T, in particular according to 20234.3-2011 standard, can be used in connection with the proposed system and/or method.

According to a preferred implementation of the charging arrangement or of the method, the charging device is arranged on ground and the first charging connector is arranged underneath the electrical vehicle. Charging contacts of the first charging connector preferably extend in a vertical manner towards ground such that the second charging connector can be connected by the bi-stable mechanics by means of a vertical upward movement. The first charging connector may comprise a cover for shielding against dirt and the like, which needs to be opened for connecting the second charging connector. A motorized means may be present for opening and closing the cover.

In another preferred implementation of the charging arrangement or of the method, the actuation device is provided as linear motor or moving of the second connector is actuated by the linear motor. The motor is preferably connected to the second charging connector respectively to the bi-stable mechanics in a semi-fixed way such that movement in vertical direction of the second charging connector in respect to the second charging connector is possible within a predefined distance. Such connection is preferably achieved by means of an elongated hole and/or allows the bi-stable mechanics to 'flip' between its stable equilibrium positions while being moved up and down. The actuation device is preferably provided for moving the second charging connector vertically up and down.

In a further preferred implementation of the charging arrangement or of the method, the bi-stable mechanics comprises at least one arm and/or spring-loaded arm, which is attached with one end to the second charging connector. The arm preferably extends between ground and the second charging connector with respect to ground, in the stable equilibrium position, in an angle between 30° and 45°. The arm may comprise metal.

In another preferred implementation, the charging arrangement or the method, comprises two spring loaded arms which each with one end are attached to opposite sides of the second charging connector with the other end are attached to ground. Preferably, the actuation device is arranged in the middle between the two arms.

In a further preferred implementation of the charging arrangement or of the method, the first charging connector comprises, in side view, a funnel-like or triangle-like shape and the second charging connector comprises a corresponding shape. Preferably, the funnel-like or triangle-like shaped area of the first charging connector and/or of the second charging connector comprises ridges having a fish-bone structure for better aligning the second charging connector with the first charging connector. Ridges having a fish-bone structure, which are preferably aligned towards the centre of the funnel, advantageously provide guidance to the first charging connector when connecting to the second charging connector.

In another preferred implementation of the charging arrangement or of the method, the second charging connector is only moved to connect with the first charging connector if the electrical vehicle is in alignment with the charging device. Such way damages of the second charging connector and/or of the bi-stable mechanics can be prevented.

In a further preferred implementation of the charging arrangement or of the method, the electrical vehicle and/or the charging device comprises a Wi-Fi-device, a camera, a radar and/or an auxiliary coil configured for detecting if the electrical vehicle is in alignment with the charging device. The Wi-Fi-device preferably emits a directed a Wi-Fi-beam. Alternatively an acoustic signal can be used. A result and/or status of the alignment detection, for example a picture showing a position of the first charging connection in respect to the charging device taken by the camera, can be displayed to a driver of the electrical vehicle on an instrument panel of the electrical vehicle or advertised via the acoustic signal. The electrical vehicle may be configured for automatically aligning with the charging device, for example in case of a self-driving electrical vehicle.

In another preferred implementation of the charging arrangement or of the method, the second charging connector is moved to connect with the first charging connector in response to a connection and/or an acoustic signal. Such way, once the electrical vehicle has stopped above and/or is in alignment with the charging device, connection is only established in response to said signal. Such implementation prevents damages to the second charging connector and/or to the bi-stable mechanics as the second charging connector is only moved under said certain conditions. In a further preferred implementation the connection between the charging connectors is first verified by an electrical signal so that thereafter charging starts. During charging and/or as long as the charging connector are connected the electrical vehicle can be hindered for driving away.

In a further preferred implementation of the charging arrangement or of the method, the first charging connector and/or the second charging connector comprises a positive Direct Current, DC, contact and a negative DC contact, a Protective Earth, PE, contact, and/or a Control Pilot, CP, contact. The first charging connector and/or the second charging connector are preferably provided according to IEC 62196 standard, for example as SAE J1772 or IEC 62196 Type 2 connectors, thereby comprising a positive DC line connected to the positive DC contact and a negative DC line connected to the negative DC contact, a PE line connected to the PE contact and/or a CP line connected to the CP contact. PP line, CP line and/or PE line and respectively signalling are preferably implemented according to the Combined Charging System, CCS, protocol, in particular according to IEC 61851 or IEC 61851-23 standard.

In another preferred implementation of the charging arrangement or of the method, the electrical vehicle is provided as an autonomous vehicle. An autonomous vehicle, also referred to as driverless car and a self-driving car, is a vehicle that is capable of sensing its environment and navigating without human input. Autonomous vehicles often combine a variety of techniques to perceive their surroundings, including radar, laser light, GPS, odometry, and computer vision. Advanced control systems interpret sensory information to identify appropriate navigation paths, as well as obstacles and relevant signage. The electrical vehicle can be provided as an electrical car, an ebus, a truck or any other electrical vehicle means.

In a further preferred implementation of the charging arrangement or of the method, the charging device is configured for charging the electrical vehicle according to IEC 61851. Said standard is an international standard for electric vehicle conductive charging systems and is one of the International Electrotechnical Commission's group of standards for electric road vehicles and electric industrial trucks, and is in the responsibility of IEC Technical Committee 69. Providing the charging device according to said standard allows a nearly global interoperability with electrical vehicles.

In another preferred implementation of the charging arrangement or of the method, the first charging connector is integrated in a vehicle body of the electrical vehicle, attached to the vehicle body and/or attached to the bottom of the electrical vehicle. The vehicle body can be provided as any vehicle body known from prior art, for example made of metal or plastic. The term arranged underneath the vehicle body is preferably understood that the first charging connector is arranged underneath the electrical vehicle thereby ground facing and/or can be connected from ground side.

Providing the first charging connector on the bottom underneath the vehicle body respectively underneath the electrical vehicle shall preferably be understood that use of other charging interfaces for example on a side of the electrical vehicle is not excluded. Thus, the proposed solution allows a backwards compatibility by combining the charging interfaces underneath the vehicle body with other charging solutions.

In a further preferred implementation of the charging arrangement or of the method, the electrical vehicle comprises a backseat and/or a rear axle, the first charging connector is arranged underneath the backseat and/or adjacent to the rear axle of the electrical vehicle. The vehicle battery is preferably arranged on the bottom of the vehicle for receiving an optimal weight distribution and in particular underneath the backseat. If the first charging connector and the vehicle battery are provided in equal manner underneath the backseat and/or adjacent to the rear axle thick cables/busbars required for connecting the first charging connector to the vehicle battery can be very short in length and thus light in weight.

FIG. 1 shows an electrical vehicle 1 and a charging device 2 configured for charging the electrical vehicle 1 with electrical energy according to an exemplary embodiment in a schematic side view. The electrical vehicle 1 is only partially depicted with a part of its vehicle body 3 facing ground 4. The electrical vehicle 1 comprises a first charging connector 5, which is integrated within the vehicle body 3 at the respective part at the bottom of the electrical vehicle 1 and faces with its fist electrical contacts 6 ground. The first charging connector 5 is arranged underneath a backseat 13 respectively a rear axle 13 of the electrical vehicle 1.

In the depicted view, the electrical vehicle 1 is parked with its first charging connector 5 above the charging device 2, which is arranged on ground 4. As can be seen from the depicted side view, the first charging connector 5 comprises a funnel-like shape with two first electrical contacts 6 arranged in the middle between two outer first electrical contacts 6. Thereby, the middle first electrical contacts 6 are arranged in a horizontal manner besides each other at a horizontal part of the funnel-like shaped first charging connector 5.

The two outer first electrical contacts 6 are arranged on tapered sides of the funnel-like shaped first charging connector 5. The two middle first electrical contacts 6 are provided as a Protective Earth, PE, contact 6 and as a Control Pilot, CP contact 6 and are respectively connected to a PE circuit and CP circuit of the electrical vehicle. The two outer first electrical contacts 6 are provided as a positive Direct Current, DC, contact 6 and as a negative DC contact 6, and are connected to a respective battery of the electrical vehicle 1 for charging the battery with electrical energy, not shown.

The charging device 2, which is provided for charging the electrical vehicle according to IEC 61851 standard, comprises a second charging connector 7, which is configured for connecting with the first charging connector 5. Such way, the second charging connector 7 comprises, in the depicted side-view, a respective, corresponding triangle like shape, which matches the funnel-like shape of the first charging connector 5. Thus, when inserting the second charging connector 7 into the first charging connector, the funnel-like shape of the first charging connector 6 centres respectively aligns the triangle-liked shaped first charging connector 7 such that second contacts 8 of the second charging connector 7 get in electrical contact with the respective first contacts 6 of the first charging connector 5.

Therefore, the second charging connector 7 also comprises two second electrical contacts 8 arranged in the middle between two outer second electrical contacts 8. In an analogous manner, the two middle second electrical contacts 7 are provided as PE contact 8 and as CP contact 8 and are respectively connected to a PE circuit and CP circuit of the charging device 2. The two outer second electrical contacts 8 are provided as positive DC contact 8 and as negative DC 8 contact, and are connected to a respective power source for providing electrical energy, not shown.

The charging device 2 comprises a bi-stable mechanics 9. The bi-stable mechanics 9 comprises two spring loaded arms 10, which are each attached with one end distant to each other to ground 4 while the respective other end is attached to the second charging connector 7, thereby holding the second charging connector 7 at two opposite sides.

Such way the bi-stable mechanics 9 holds the second charging connector 7 in two stable equilibrium positions, whereby in one stable equilibrium position the second charging connector 7 is electrically connected to the first charging connector 5 and the other stable equilibrium position the second charging connector 7 is unconnected to the first charging connector 5. In particular, in the other stable equilibrium position, the second charging connector 7 is arranged distant to the first charging connector 5 close towards ground 4 such that the electrical vehicle 1 may drive away from the charging device 2 or onto the charging device 2.

For moving the bi-stable mechanics 9 between the two equilibrium positions, the charging device comprises an actuation device 11 provided as linear motor. The actuation device 11 is attached at one end to ground 4 and at another, opposite end to the second charging connector 7 in a semi-permanent way by means of an elongated hole allowing a predefined range of vertical movement of the second charging connector 7 in respect to the actuation device 11. Such way the second charging connector 7, when connected to the first charging connector 5, can be first moved down against the spring forces of the arms 10 out of the one stable equilibrium position towards ground 4 and then "flip" into the other stable equilibrium position close to ground 4. Thereafter, the electrical vehicle 1 may drive away from the charging device 2.

For charging the electrical vehicle 1 with electrical energy, the electrical vehicle 1 stops above the charging device 2 such that the first charging connector 5 is positioned respectively aligned with the second charging connector 7. For exactly positioning the electrical vehicle 1 above the charging device 2, the electrical vehicle 1 comprises a camera 12, which is attached to the vehicle body 3 and directed towards ground 4. Alternatively or in addition, the camera 12 can be attached to the charging device 2. Instead of the cameras 12, the electrical vehicle 1 and/or the charging device 2 may comprises a Wi-Fi-device, a radar and/or an auxiliary coil configured for detecting if the electrical vehicle 1 is in alignment with the charging device 2 such that the positioning is facilitated.

Once the electrical vehicle 1 is positioned above the charging device 2 in a desired position, the second charging connector 7 is moved by the actuation device 11 to connect with the first charging connector 5 in response to a connection and/or acoustic signal issued by the electrical vehicle 1. Specifically, the actuation device 11 moves the second charging connector 7 and thereby the two arms 10 of the bi-stable mechanics 9 that connected to the second charging connector 7 vertically upwards and thereby away from ground 4 out of the other stable equilibrium position. First the actuation device 11 moves the second charging connector 7 against the spring forces of the arms 10 which then "flip" into the one, upper stable equilibrium position such that the second charging connector 7 gets inserted and thereby establishes electrical contact with the first charging connector 5. Once connected, the actuation device 11 may move up a bit further for increasing contact force between the charging connectors 5, 7 for enabling high power charging.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS LIST 1 electrical vehicle
2 charging device
3 vehicle body
4 ground
5 first charging connector
6 first charging contact
7 second charging connector
8 second charging contact
9 bi-stable mechanics
10 arm
11 actuation device
12 camera
13 backseat, rear axle

What is claimed is:

1. A charging arrangement comprising an electrical vehicle and a charging device configured for charging the electrical vehicle with electrical energy, wherein
   the electrical vehicle comprises a first charging connector, and
   the charging device comprises:
      a second charging connector configured for connecting with the first charging connector;
      a bi-stable mechanics attached to the second charging connector and configured for holding the second charging connector in two stable equilibrium positions, wherein, in a first stable equilibrium position, the second charging connector is connected to the first charging connector, and in a second stable equilibrium position, the second charging connector is unconnected to the first charging connector, and wherein the bi-stable mechanics comprises two spring loaded arms, wherein first ends of the two spring loaded arms are attached to opposite sides of the second charging connector, and second ends of the two spring loaded arms are attached to ground; and
      an actuation device configured for moving the second charging connector between the two stable equilibrium positions.

2. The charging arrangement according to claim 1, wherein the charging device is arranged on the ground, and the first charging connector is arranged underneath the electrical vehicle.

3. The charging arrangement according to claim 1, wherein the actuation device comprises a linear motor, and wherein the moving the second charging connector is actuated by the linear motor.

4. The charging arrangement according to claim 1, wherein the first charging connector comprises, in a side view, a funnel-like or triangle-like shape, and the second charging connector comprises a corresponding shape.

5. The charging arrangement according to claim 1, wherein the second charging connector is only moved to connect with the first charging connector after the electrical vehicle is in alignment with the charging device.

6. The charging arrangement according to claim 1, wherein the electrical vehicle and/or the charging device comprises a Wi-Fi-device, a camera, a radar and/or an auxiliary coil configured for detecting if the electrical vehicle is in alignment with the charging device.

7. The charging arrangement according to claim 1, wherein the second charging connector is moved to connect with the first charging connector in response to a connection and/or acoustic signal.

8. The charging arrangement according to claim 1, wherein the first charging connector and/or the second charging connector comprises a positive Direct Current (DC) contact, a negative DC contact, a Protective Earth (PE) contact, and/or a Control Pilot (CP) contact.

9. The charging arrangement according to claim 1, wherein the electrical vehicle is provided as an autonomous vehicle.

10. The charging arrangement according to claim 1, wherein the charging device is configured for charging the electrical vehicle according to IEC 61851.

11. The charging arrangement according to claim 1, wherein the first charging connector is integrated in a vehicle body of the electrical vehicle, attached to the vehicle body, and/or attached to a bottom of the electrical vehicle.

12. The charging arrangement according to claim 1, wherein the electrical vehicle comprises a backseat and/or a rear axle, the first charging connector is arranged underneath the backseat and/or adjacent to the rear axle of the electrical vehicle.

13. A method for charging an electrical vehicle, the method comprising providing a charging device configured for charging the electrical vehicle with electrical energy,
   the charging device comprising:
      a second charging connector configured for connecting with a first charging connector of the electrical vehicle; and
      a bi-stable mechanics attached to the second charging connector, configured for holding the second charging connector in two stable equilibrium positions, wherein the bi-stable mechanics comprises two spring loaded arms, and wherein first ends of the two spring loaded arms are attached to opposite sides of the second charging connector, and second ends of the two spring loaded arms are attached to ground
   the method further comprising:
      moving the second charging connector between the two stable equilibrium positions, wherein, in a first stable equilibrium position, the second charging connector is connected to the first charging connector, and in a second stable equilibrium position, the second charging connector is unconnected to the first charging connector.

14. The method according to claim 13, wherein the charging device is arranged on the ground, and the first charging connector is arranged underneath the electrical vehicle.

15. The method according to claim 13, wherein the actuation device comprises a linear motor, or wherein the moving the second charging connector is actuated by the linear motor.

16. The method according to claim 13, wherein the first charging connector comprises, in side view, a funnel-like or triangle-like shape, and the second charging connector comprises a corresponding shape.

17. The method according to claim 13, wherein the second charging connector is only moved to connect with the first charging connector after the electrical vehicle is in alignment with the charging device.

18. The method according to claim 13, wherein the electrical vehicle and/or the charging device comprises a Wi-Fi-device, a camera, a radar and/or an auxiliary coil configured for detecting if the electrical vehicle is in alignment with the charging device.

19. The method according to claim 13, wherein the second charging connector is moved to connect with the first charging connector in response to a connection and/or acoustic signal.

20. The method according to claim 13, wherein the first charging connector and/or the second charging connector comprises a positive Direct Current (DC) contact, a negative DC contact, a Protective Earth (PE) contact, and/or a Control Pilot (CP) contact.

21. The method according to claim 13, wherein the electrical vehicle is provided as an autonomous vehicle.

22. The method according to claim 13, wherein the charging device is configured for charging the electrical vehicle according to IEC 61851.

23. The method according to claim 13, wherein the first charging connector is integrated in a vehicle body of the electrical vehicle, attached to the vehicle body and/or attached to a bottom of the electrical vehicle.

24. The method according to claim 13, wherein the electrical vehicle comprises a backseat and/or a rear axle, the first charging connector is arranged underneath the backseat and/or adjacent to the rear axle of the electrical vehicle.

* * * * *